March 4, 1969   K. J. HALL   3,430,784
APPARATUS FOR STACKING AND SORTING PANELS
Filed Nov. 29, 1965   Sheet 1 of 6

KENNETH J. HALL
INVENTOR
BY
BUCKHORN, BLORE, KLARQUIST & SPARKMAN
ATTORNEYS

KENNETH J. HALL
INVENTOR

BY
BUCKHORN, BLORE, KLARQUIST & SPARKMAN
ATTORNEYS

United States Patent Office 3,430,784
Patented Mar. 4, 1969

3,430,784
APPARATUS FOR STACKING AND
SORTING PANELS
Kenneth J. Hall, Portland, Oreg., assignor to Western Machinery Corporation, Portland, Oreg., a corporation of Oregon
Filed Nov. 29, 1965, Ser. No. 510,349
U.S. Cl. 214—6                                26 Claims
Int. Cl. B65g 57/00; B65h 29/58

ABSTRACT OF THE DISCLOSURE

A sorting system for panels including at least one intermediate stacker and an end stacker arranged end to end at the downstream end of a conveyor line. An operator at a patching station upstream from the stackers operates a control panel having selector switches for determining which one of the several stackers will receive each panel passing by the operator. The operator shoves each panel into a set of pinch rolls at the offbear end of the patching station which feed the panel onto support rails in the first stacker. If another stacker has been preselected to receive the panel, it is conveyed horizontally along the rails of the first stacker to booster wheels which feed the panel onto similar rails of the next stacker. These rails pivot downwardly to drop the panel vertically onto a stacking table. Each stacker includes side and end crowders for mainainting a squared sack, an unloading device and an accumulator for receiving panels to be stacked while the unloading device is removing a stack.

---

The present invention relates to an apparatus for stacking panels of plywood, hardboard and other materials, and to a system for sorting panels by grade or any other desired criteria utilizing a plurality of stacking units.

Although stackers capable of stacking panels automatically have been devised heretofore, such prior stackers have been expensive, complex and not entirely reliable. One well-know type of prior stacker utilizes a series of laterally opposed rollers which extend beneath a panel flow path for supporting the opposite edges of panels conveyed therealong, as shown in U.S. Patent 2,733,921. The rollers pivot downwardly after receipt of a panel to drop the same onto a stack beneath the rollers. One of the disadvanages of pivoting rollers or wheels to first support and then drop a panel onto a stack is that on occasion one or more of the wheels or rollers fail to rotate because of bearing or lubrication failure, and the jammed wheels or rollers mark the undersurface of panels slid thereon. In addition, stackers of this type do not handle warped panels well because the spacing between longitudinally adjacent rollers or wheels frequently cause warped panels to hang up before they reach their stacking positions. Difficulty is also encountered with such stackers in maintaining proper lateral and longitudinal positioning of the panels on the rollers so as to achieve an unobstructed release of the panel onto the stack.

Accordingly, a primary object of the invention is to provide a new and improved panel stacker which overcomes the difficulties encountered with prior stackers, and particularly stackers of the pivoting roller or wheel type.

More specifically, a primary object of the invention is to provide a new and improved stacker incorporating a novel panel-receiving means for supporting, conveying and releasing vertically a panel within the stacking unit.

Another important object is to provide a stacker as aforesaid which handles either warped or flat panels with equal facility without any hang-up of the panel within the stacker.

Another object of the invention is to provide a new and improved stacker capable of alternatively conveying a panel horizontally therethrough to a downstream stacker or vertically onto a stack within the unit, whereby the stacker can be used in multiples as elements of a sorting system.

A further object is to provide a new and improved infeed means for feeding panels onto the panel-receiving means.

Still another object is to provide a stacker as aforesaid including novel booster means for selectively conveying panels horizontally from the receiving means through the stacker to an adjacent stacking unit.

Yet another object is o provide a stacker including improved means capable automatically of (1) feeding a panel onto the receiving means thereof, (2) releasing the panel vertically onto a stacking table within the unit, (3) maintaining the stack vertical and at a constant level during the stacking operation, (4) unloading the stack from the table and removing it from the stacker when the stack reaches a predetermined height, and (5) continuing the stacking operation during the removal of a stack from the unit through the use of auxiliary stacking means.

Other objects are to provide a panel stacker which is relatively simple and inexpensive to construct, operate and maintain and which is reliable in operation.

The sorting of panels in the manufacture of plywood heretofore has been to a large extent a hand operation requiring the employment of numerous skilled graders. While some semi-automatic sorting systems have been devised, such systems have been highly complex and have required the use of expensive machinery. Furthermore, such systems have been comparatively slow in operation.

Accordingly, another primary object of the invention is to provide a new and improved panel-sorting system capable of sorting panels into several stacks by grade or by any other criteria automatically upon preselection of the desired stack.

Another object is to provide a panel-supporting system capable of sorting panels at an unusually high rate of speed.

Still another object is to provide a panel-sorting system adaptable for use in conventional plywood operations, at the downstream end of any conveyor line, as for example, at the outfeed end of a plywood patching station or sanding station.

A more specific object is to provide a new and improved panel-sorting system utilizing any desired multiple of individual stacking units, depending on the number of sorts desired, in conjunction with a common remote control means for preselecting the stacking unit in which a given panel is to be stacked.

Another specific object is to provide a panel-sorting system including an end stacker and at least one intermediate stacker capable of alternatively conveying a panel horizontally to the end stacker or vertically onto a stack within the intermediate unit.

Still another specific object is to provide a panel-sorting system as aforesaid wherein the remote control means incorporates a memory system enabling the delivery of panels to the stackers in rapid succession without waiting for the last preceding panels to be stacked.

The above and other objects and advantages of the invention will become more apparent from the following detailed description which proceeds with reference to the accompanying drawings wherein:

GENERAL DESCRIPTION

Figure 1:
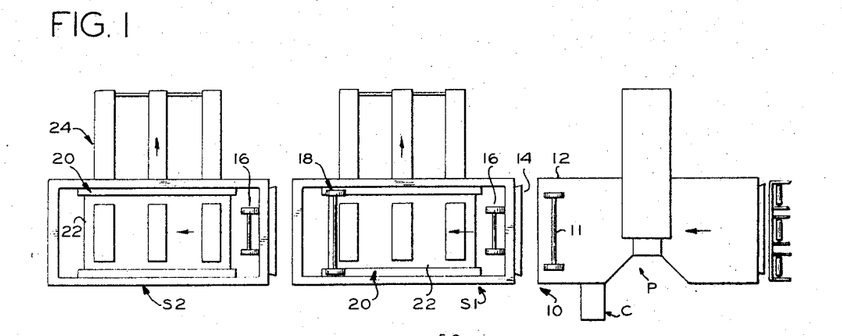
FIG. 1 is a schematic top plan view of a plywood conveyor line incorporating stackers and a sorting system in accordance with the present invention.

With reference to the drawings and particularly the general layout of FIG. 1, the illustrated sorting system comprises a series of two stacking units including an intermediate stacker $S_1$ and an end stacker $S_2$ arranged end to end at the downstream end of a conveyor line indicated generally at 10 for the manufacture of, for example, plywood panels. In the illustrated conveyor line, the two stackers are positioned just downstream from a patching station P where an operator is stationed to operate the panel patching machine and also to operate a remote control panel C which contains selector switches (see FIG. 11) for determining which one of the two stackers will stack each panel passing the operator.

Figure 11:
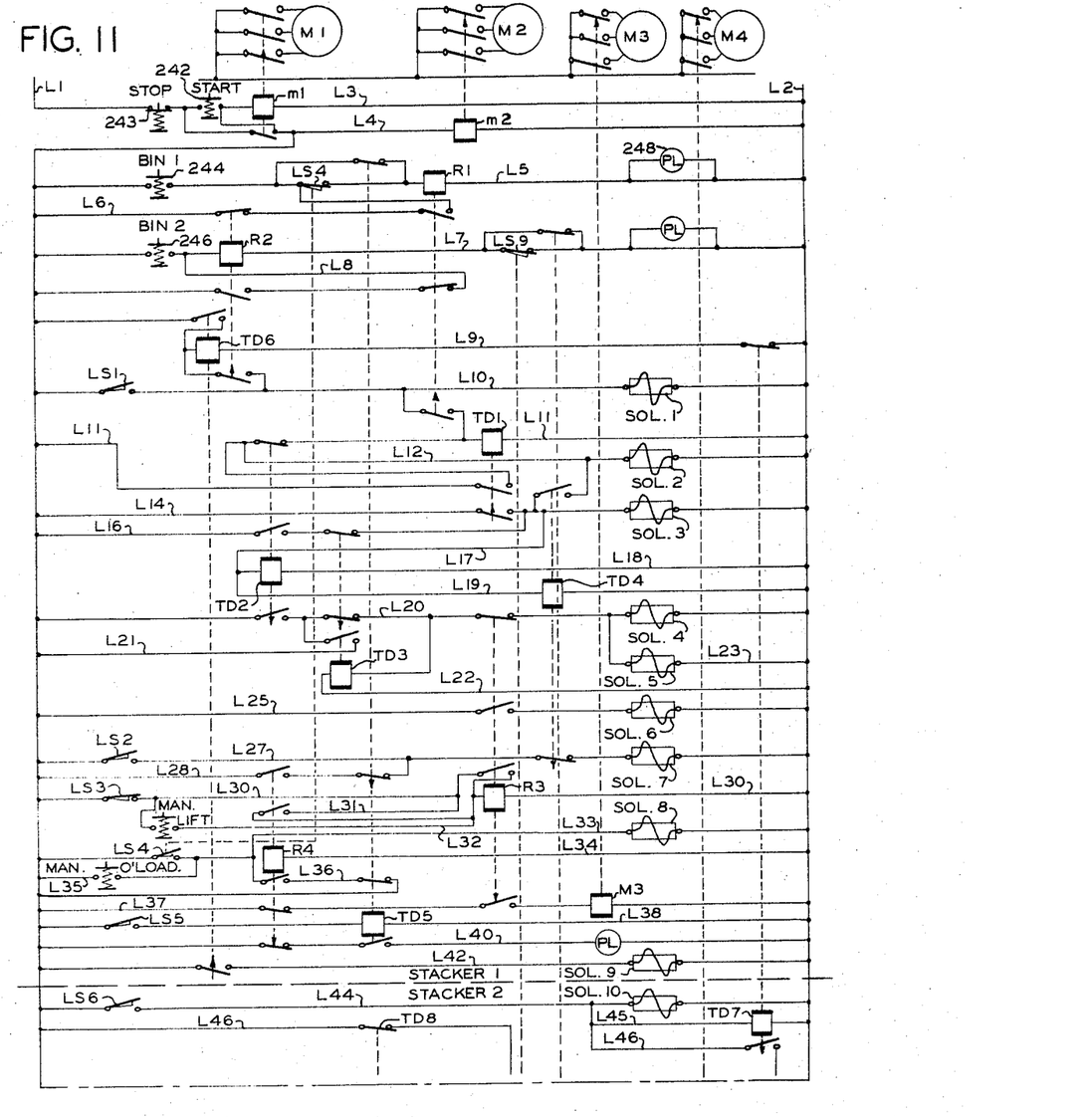
FIG. 11 is an electrical diagram of the control for operating the panel-sorting system shown in FIG. 1.

After the operator positions a panel in the panel-patcher and the machine begins its automatic routing and patching operation, the operator would select on the control panel, by pressing the appropriate selector button, the stacker into which the panel should be deposited. For example, if the stackers stack the panels by grade, stacker $S_1$ might be used to stack panels that needed restanding because of having been patched, whereas stacker $S_2$ could be used to stack panels that needed further patching. After a panel has been patched, the opeartor shoves the panel into a set of pinch wheels 11 at the offbear end of a support table 12 for the patcher to feed the same into the infeed end 14 of stacker $S_1$. If end stacker $S_2$ has been selected to stack the panel, the panel is conveyed horizontally by infeed wheels 16 and booster wheels 18 through stacker $S_1$ and into stacker $S_2$ wherein the panel would automatically be released vertically by receiving rails 20 onto a stacking table 22 within the stacker. However, if the panel were to be stacked in intermediate stacker $S_1$, receiving rails 20 within such stacker like those in stacker $S_2$ would automatically drop to release the panel onto table 22 within such stacker.

In addition to the foregoing, each stacker is provided with side and end crowding means for maintaining a vertical stack and unloading means, including outfeed rolls 24, for conveying a stack from within a stacker to a position alongside the same when a stack reaches a predetermined height. Accumulator means are also provided for continuing the sorting and stacking of panels within a stacker while it is being unloaded so that the sorting operation need not be interrupted during this period.

It will be apparent from the foregoing that any panel processing station or conveyor could precede the two stackers, and that any number of processing stations could precede the stacking stations. More importantly, any number of two or more stacking units, including one end stacker and one or more intermediate stackers as described hereinafter can make up the sorting system in conjunction with a control means for preselecting the stacker into which each panel is to be deposited.

The sorting system herein illustrated has been used to sort panels traveling along a conveyor line at a rate of 200 feet per minute. This is made possible through provision of a control means which incorporates a memory circuit enabling the operator to select on a remote control panel the stacker within which a panel passing by him is to be stacked as the panel is conveyed past him, without waiting for the last preceding panels to be stacked.

INTERMEDIATE STACKING UNIT

General assembly

The intermediate and end stackers $S_1$ and $S_2$ have many duplicate functions and therefore many features in common. However, the intermediate stacker must be capable of conveying panels horizontally therethrough to the end stacker as well as capable of releasing panels vertically onto a stack and so incorporates certain features not found in the end stacker, which need only be equipped to stack panels and handle the stack. Accordingly, the illustrated stacker of FIGS. 2 through 10 is an intermediate stacker, with the differences between the intermediate stacker and the end stacker being pointed out following the description of the former.

Figure 2:
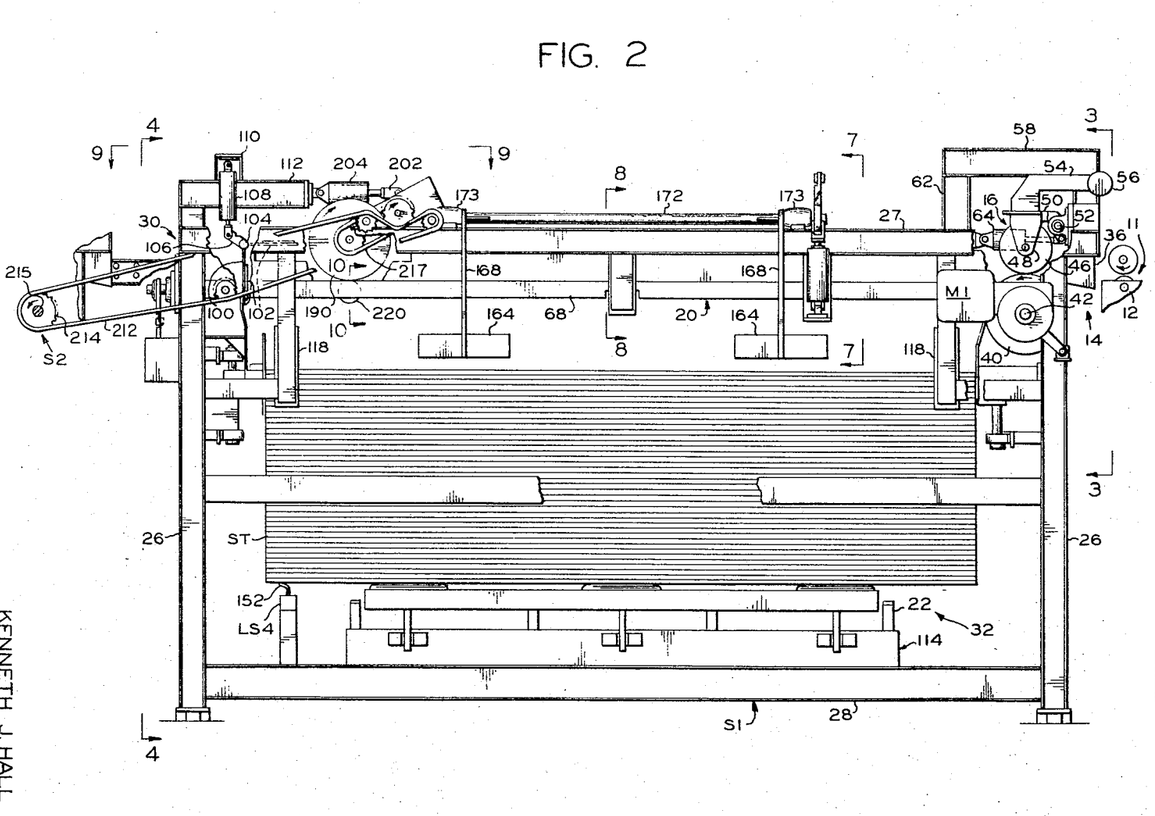
FIG. 2 is a side elevational view of the upstream one of the two stackers shown in FIG. 1.
Figure 3:
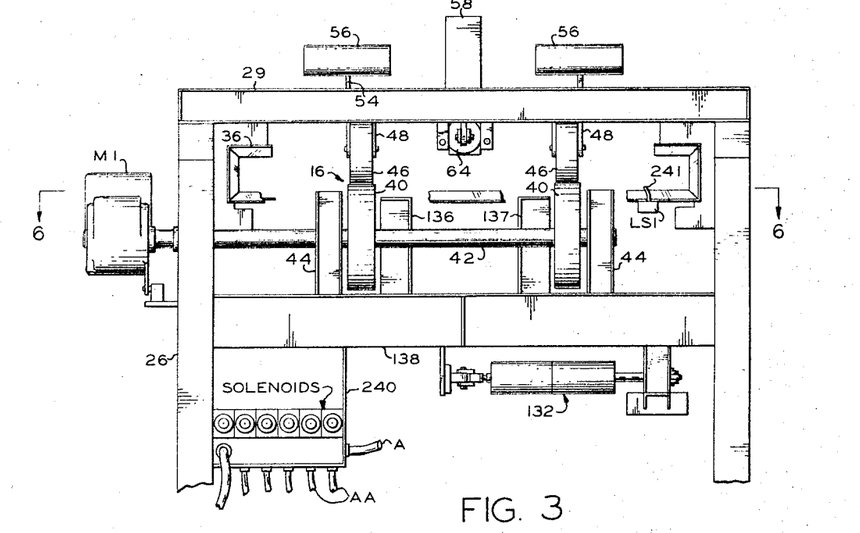
FIG. 3 is a fragmentary infeed end view taken approximately along the line 3—3 of FIG. 2, on a scale slightly enlarged from that of FIG. 2.
Figure 6:
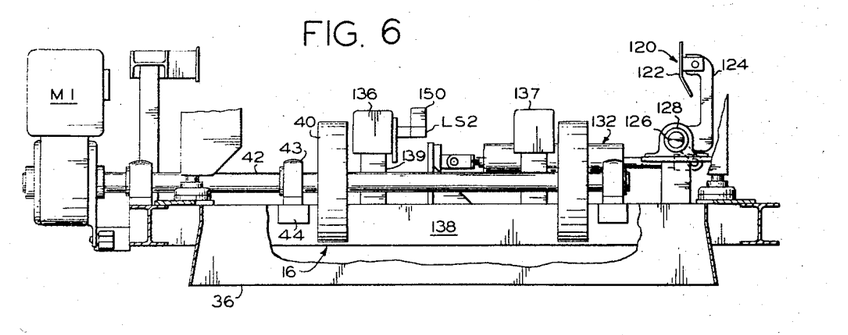
FIG. 6 is a horizontal sectional view taken approximately along the line 6—6 of FIG. 3 showing an infeed end portion of the machine on approximately the same scale as FIG. 3.

With reference to FIGS. 2, 3 and 6, the intermediate stacker $S_1$ includes upright corner frame members 26, horizontal top and bottom side frame members 27 and 28, respectively, and horizontal end frame members 29 which together define a generally open rectangular frame structure including infeed end 14, an outfeed end 30 and an interior space defining a panel-receiving bin 32.

Infeed means

Panels are fed by pinch rolls 11 or any other upstream conveyor means into an inwardly converging infeed panel guide structure 36 at the upper infeed end of the stacker as shown best in FIGS. 3 and 6. The panel guide structure guides panels horizontally between the infeed pinch wheels 16, which include a lower pair of driven wheels 40 carried on a shaft 42 rotatably mounted in bearings 43 on upright supports 44. The shaft is driven by a gear reduction electric motor M1.

The infeed wheels also include an upper pair of pressure wheels 46, each rotatably carried between a pair of fork arms 48 which are in turn connected by a forwardly extending arm 50 to a common pivot shaft 52. Extending upwardly from each fork arm and forwardly over the pivot shaft is another pair of arm members 54 which carry at their outer ends a counterweight 56 to counterbalance the weight of the pressure wheels 46 and thus facilitate pivoting of the pressure wheels up and down about pivot shaft 52. An overhead frame member 58 cantilevered over the upper central infeed end of the stacker has a downwardly extending rear portion 62 which mounts at its lower end a horizontal air cylinder 64. The cylinder pivots the pressure wheel 46 vertically about the axis of pivot shaft 52 and into engagement with the upper surface of an entering panel. Driven infeed wheels 40 are driven in a direction to convey the panel downstream into the upper end of the stacking unit when the pressure wheels press an entering panel into engagement with the driven wheels.

Panel-supporting and releasing rails

Figure 4:
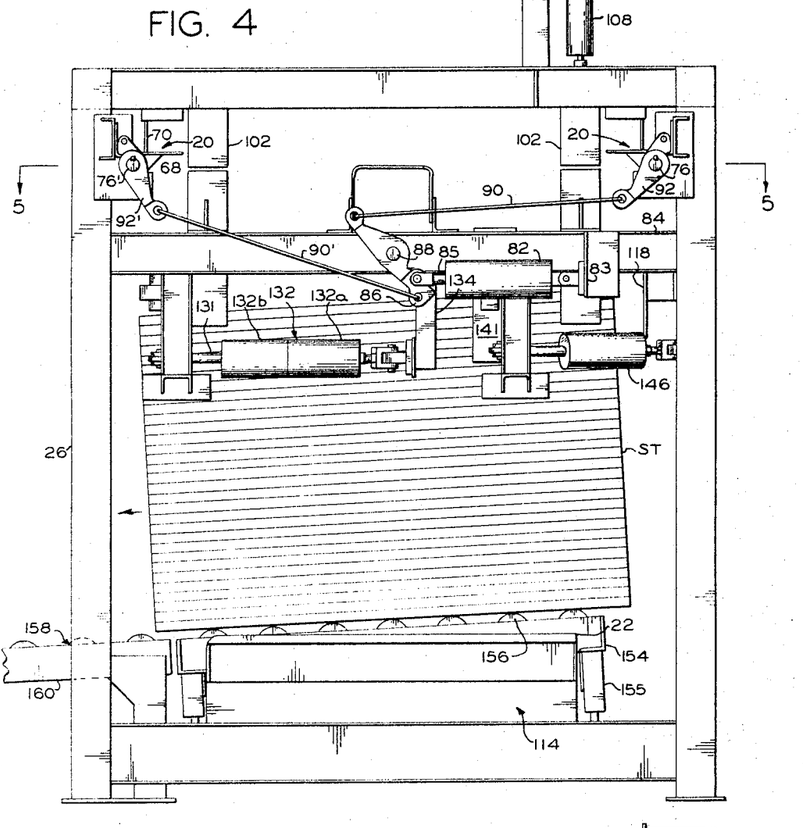
FIG. 4 is an outfeed end elevational view of the stacker of FIG. 2 on approximately the same scale as FIG. 3.
Figure 8:
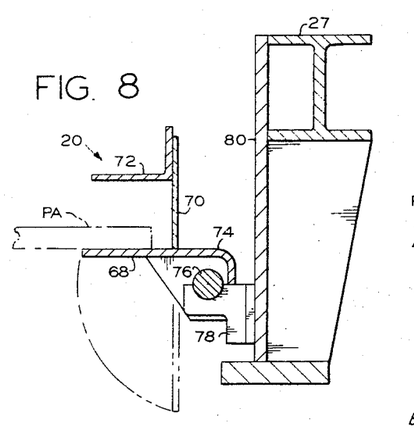
FIG. 8 is a vertical sectional view taken along the line 8—8 of FIG. 2 showing the panel-supporting and releasing means of the stacker in its panel-supporting position.

Referring to FIGS. 2, 4 and 8, a pair of panel-receiving rail members 20 extend longitudinally within the upper end of the stacker frame on opposite sides thereof at a suitable level for receiving and supporting thereon panels fed rearwardly by the infeed wheels. These rails extend longitudinally throughout substantially the full length of the frame and are supported at the opposite ends of the latter. As shown best in FIG. 8, each rail is generally channel-shaped in cross section and includes a bottom panel-receiving flange, or bar, 68 for supporting a side edge of a panel PA, an upright panel-guiding flange 70 defining the laterally outer limits of the supporting portion of the receiving bar, and extending upwardly therefrom, and an upper, panel-confining flange 72 extending laterally inwardly from an upper portion of the guide flange above the receiving bar for retaining a panel within the space defined by the three flange portions of the rail.

The receiving bar 68 is mounted for downward pivoting movement relative to the side and top flanges to release a panel therefrom. For this purpose, the receiving bar includes a webbed rear extension 74 which is rigidly mounted on a longitudinally extending pivot shaft 76 mounted for pivoting movement within a bearing bracket 78. Bracket 78 in turn is secured to a webbed mounting plate 80 extending downwardly from and secured to the inside of top side frame member 27. The upper surface of receiving bars 68 is preferably smooth and highly polished to enable panels to slide readily thereover when fed onto the bars by the infeed rolls.

With reference to the outfeed end view of FIG. 4, the two receiving bars 68 are pivoted downwardly simultaneously about the axes of pivot shafts 76 to drop a panel supported thereon vertically into the bin beneath the rails. The means for accomplishing this includes a horizontally disposed air cylinder 82 mounted by a bracket 83 on an end frame member 84. The piston rod 85 of cylinder 82 is connected at its outer end to a double throw crank 86 on a stub shaft 88 journaled in a bearing at the midportion of end frame member 84. One arm of the crank is connected by a tie rod 90 to a lever member 92 which in turn is keyed to pivot shaft 76 for the right-hand receiving bar 68 as viewed in FIG. 4. The other arm of the crank is connected in the same manner to a lever 92′ for pivot shaft 76 of the left-hand receiving bar. Thus extension of piston rod 85 of cylinder 82 drops the two receiving bars simultaneously, whereas retraction of the piston rod returns the rails to their horizontal positions.

*Stacking assembly*

When a panel is to be stacked within intermediate stacker $S_1$, a normally upwardly retracted stop 100 near the outfeed end of the stacker is pivoted downwardly into the path of a panel on the receiving bars, as shown in FIG. 2, so as to limit the panel's downstream progress at a position centering the panel within the stacker. The retractable end stop includes a pair of stop plates 102 (FIGS. 2 and 4) fixed at laterally spaced-apart positions to a pivot shaft 104 journaled at its opposite ends in bearings 105 (FIG. 9) on the top side frame members 27. A pivot arm 106 extends rearwardly from the shaft and is connected to a piston rod of a vertical air cylinder 108 suspended from a cylinder mount 110 carried on a rear overhead frame member 112. Extension of the cylinder rod pivots the stop plates 102 to a horizontal, retracted position as shown in dashed lines in FIG. 2, whereas retraction of the cylinder swings the stop plates to their vertical positions. Each stop plate preferably carries a pad on its front face to prevent damage to a panel during impact.

When the stop is swung to its operative position and the receiving bars thereafter dropped, a panel supported on the latter drops vertically onto the top of a stack ST of panels previously stacked on the platform structure, or table 22 of a scissors lift 114 which, when empty would be at approximately the same level as the top of the stack of panels shown in FIG. 2. However, since the height of the stack gradually increases during the stacking operation, means are provided for lowering the table slightly upon the addition of each new panel to the stack so that the stop of the stack remains at a substantially constant level within the bin. The table will continue to lower as new panels are added until the table supports a full stack, whereafter the table is lowered to its lower limit position as shown in FIGS. 2 and 4. Of course, the lift could be eliminated if desired and panels dropped from the receiving bars onto a table at the bottom of the bin.

In order to maintain a vertical stack on the platform, side and end crowding means are provided. The side crowding means includes a pair of fixed side crowders 118 secured to one side of the frame and positioned at about the level of the top of the stack, as shown best in FIG. 2. A pair of movable side crowders 120 are positioned at the opposite side of the frame (FIG. 5) for pushing each newly stacked panel against the fixed side crowders 118. Each of the movable crowders includes a panel-engaging face plate 122 fixed to a gate 124 which in turn is fixed to a vertical pivot shaft 126 journaled in bearings 128 on the frame just inwardly of each end of the machine. A pivot arm 130 fixed to the shaft is also connected to the outer end of the piston rod 131 of a tandem air cylinder 132 including a short stroke section 132a for providing the crowding action and another section 132b providing a greater stroke for swinging the gate 124 open when fully retracted to permit removal of a full stack from the stacking platform. The piston rod of cylinder section 132a is connected at its outer end to a vertical support member 134 secured to the end of the main frame as shown in the outfeed end view of FIG. 4.

Figure 5:
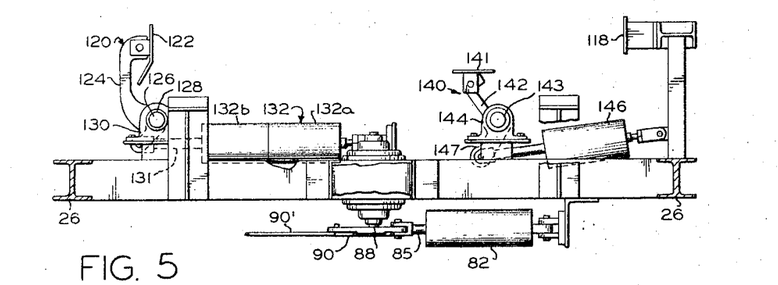
FIG. 5 is a horizontal sectional view through an upper outfeed end portion of the stacker of FIG. 2 taken approximately along the line 5—5 of FIG. 4.

Referring to FIGS. 3 and 5, the end crowder means include a pair of laterally spaced, stationary end crowders 136, 137 secured to an intermediate frame member 138 at the infeed end of the stacker by support arms 139. A single movable end crowder 140 at the outfeed end of the frame includes a face plate 141 attached to a crowder arm 142 which in turn is secured to a vertical pivot shaft 143 journaled in a shaft mount 144 and pivoted by the piston rod of a horizontal air cylinder 146 through pivot arm 147 fixed to the pivot shaft. Thus by extending and retracting the piston rod of cylinder 146, panels at the upper end of the stack are shoved against the fixed end stops.

*Unloading assembly*

The movable side and end crowders are activated each time a panel is added to the stack to push the newly added panel against the fixed side and end crowders, thus maintaining the panels of the stack in vertical alignment. When this occurs, an end edge of the newly added panel is pushed against a contact 150 of a limit switch LS2 mounted on fixed end stop 136 as shown clearly in FIG. 6 to lower the platform of the scissors lift. The platform continues to lower until the end edge of the new panel drops below the switch contact to deenergize switch LS2 and thereby stop the downward movement of the table. Thus the amount of downward movement of the table upon the addition of each new panel depends on the thickness of the panel, and the top of the stack is thus retained at a substantially constant level during the stacking operation.

When the platform supports a full stack of predetermined height, the platform will be lowered to such an extent that the bottom panel of the sack strikes an actuator 152 of another limit switch LS4 which is thereby energized to lower the table to a lower limit position beneath the level of a laterally tilted roll case 154 supported on adjustable length legs 155 and containing three rows of gravity rollers 156 which then support the stack. The rollers convey the stack by gravity laterally toward an open side of the bin and onto a set of outfeed rolls 158 in a roll case 160 tilted so that rolls 158 define a continuation of the inclined plane defined by the rollers 156. The rolls 158 convey the stack through an open side of the bin between frame legs 26 to a position alongside the stacker where the stack can easily be transported to another location for shipment or further processing. Of course, a powered chain or other conveyor could be substituted for the gravity conveyor just described.

During the foregoing-described stack unloading operation, the stacker can continue to stack panels because of the provision of accumulator means between the stacking platform and the receiving rails which come into play as soon as the unloading operation begins and the stacking table becomes temporarily inactive. The accumulator means is illustrated best in FIGS. 2 and 7 and includes two sets of opposed accumulator bars 164, 166. One set is mounted on each of the laterally opposite sides of the frame, and each set includes two such bars spaced apart longitudinally. Each bar is mounted at the outer lower end of an inwardly inclined pivot arm 168 having a horizontal upper section 170 which is fixed to a horizontal and longitudinally extending pivot shaft 172 journaled at its opposite ends in bearing members 173 on a top cross frame member 174 of the machine. Each pivot shaft 172 is common to both accumulator bars on the same side of the machine. The pivot shaft 172 on the right-hand side of the machine as viewed in FIG. 7 includes a downwardly extending crank arm 176 while the corresponding pivot shaft 172' on the opposite side of the machine carries an upwardly extending crank arm 178, with the two opposed crank arms being interconnected by a tie rod 180. Crank arm 178 has a rearward extension 182, the rear end of which is connected to the piston rod 183 of a vertical air cylinder 184 mounted on a bracket 186 carried by top side frame member 27. A counterweight rod 188 extends between and is carried by the innermost ends of the upper sections 170 of each pair of pivot arms 168 to equalize the forces acting on opposite sides of shaft 172 and thus facilitate pivoting of the accumulator bars.

Figure 7:
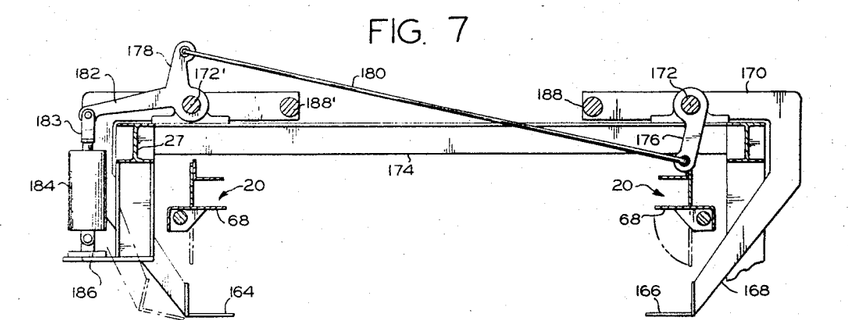
FIG. 7 is a vertical sectional view taken along the line 7—7 of FIG. 2 showing the panel accumulators for the stacker on approximately the same scale as FIG. 6.

With the foregoing arrangement, extension of piston rod 183 pivots crank arm 178 in a clockwise direction and crank arm 176 in a counter clockwise direction to retract both accumulator arms simultaneously. Retraction of the piston rod of the air cylinder has the opposite effect of extending the accumulator arms inwardly beneath the receiving bars 68 to catch any panels dropped by the receiving bars while the stacking platform is being unloaded.

*Booster assembly*

When a panel is to be fed horizontally through intermediate stacker $S_1$ to end stacker $S_2$, none of the foregoing stacking or unloading operations will occur, with respect to that panel in stacker $S_1$, and specifically, the receiving bars will remain in their horizontal dispositions and the retractable end stop 100 remains in its upper, retracted position. Booster means are provided for conveying the panel horizontally from the receiving rails through the outfeed end of stacker $S_1$ and into the infeed end of stacker $S_2$.

Figure 9:
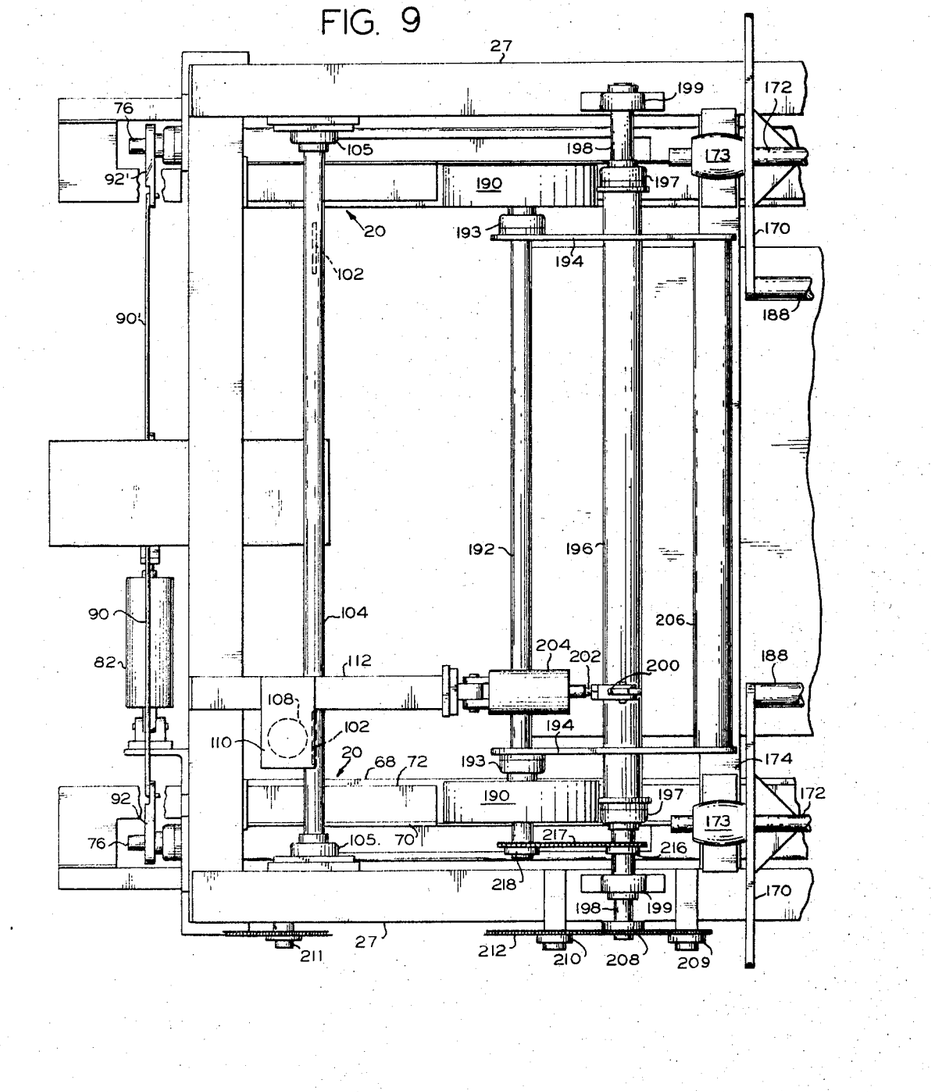
FIG. 9 is a fragmentary top plan view of the outfeed end of the machine taken approximately along the line 9—9 of FIG. 2 on a considerably larger scale than FIG. 2.

With reference now to FIGS. 2 and 9, the booster means includes a pair of driven, rubber-surfaced booster wheels 190 fixed to the opposite ends of a wheel shaft 192, which is journaled adjacent its opposite ends in bearing members 193 on the rear ends of a pair of laterally spaced-apart pivot arms 194. The arms are affixed intermediate their opposite ends to a pivot tube 196. Pivot tube 196 is rotatably carried by bearings 197 on a wheel drive shaft 198, which itself is journaled in bearing members 199 on the opposite top side frame members 27. Thus drive shaft 198 can be driven without rotating pivot tube 196, and conversely tube 196 can be pivoted independently of shaft 198. The pivot tube carries an upwardly extending ear 200 to which is connected the piston rod 202 of a horizontal air cylinder 204, which is pivoted at its cylinder end to rear overhead frame member 112. Thus extension and retraction of the piston rod 202 pivots booster wheels 190 vertically about the axis of drive shaft 198 and into and out of engagement with a panel on receiving bars 68. The forward ends of pivot arms 194 carry a counterweight 206 to facilitate this pivoting movement.

Wheel shaft 192, and thus booster wheels 190, is driven in a clockwise direction as viewed in FIG. 2 so that the wheels when engaging a panel on the receiving bars will boost the panel downstream along the polished rails and through the outfeed end of the frame and into the next stacking unit. The outfeed drive means includes a drive sprocket 208 at one end of drive shaft 198 and three idler sprockets 209, 210 and 211 around which a drive chain 212 is trained in the manner shown in FIG. 2. The drive chain extends around another, driven sprocket 214 on the infeed wheel drive shaft 215 of the next succeeding stacking unit $S_2$ so that the chain is driven off the motor M2 of end stacker $S_2$. This eliminates the necessity of providing a long drive connection between motor M1 at the infeed end of stacker $S_1$ and the booster assembly of the same stacker. Another sprocket 216 on booster drive shaft 198 is connected by another drive chain 217 to a sprocket 218 on the outer end of wheel shaft 192 to drive the shaft and booster wheels in a clockwise direction, such other chain and sprockets being shown in FIG. 9.

Although the smooth top surfaces of the receiving bars will normally offer so little frictional resistance to sliding of a panel thereover when the latter is engaged by the drive wheels that the panel will easily be boosted into the next stacker, a pair of booster idler wheels 220 (FIGS. 2 and 10) are preferably provided, one on each receiving bar 68 beneath each booster drive wheel 190, as additional assurance that the panels will be boosted on to the next stacker in every instance.

Figure 10:
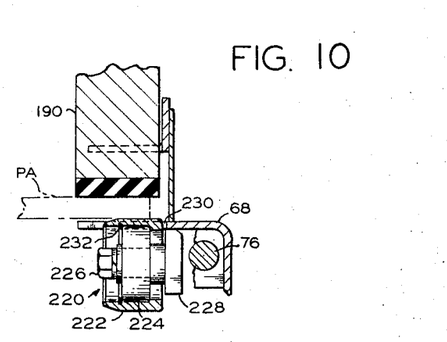
FIG. 10 is a vertical sectional view taken along the line 10—10 of FIG. 2 showing a portion of the panel booster wheel assembly.

Each idler wheel 220 includes an outer wheel portion 222 carried on an inner ball bearing unit 224 which is rotatably carried on a stationary shaft 226. Shaft 226 is fixed to a wheel-mounting block 228, which in turn is secured, as by welding, to an undersurface portion of receiving bar 68. The upper periphery of the tire projects through a slot 230 in the receiving bar slightly above the top surface of such bar so as to engage a panel PA supported on the bar. A snap ring 232 retains the tire portion of the idler on the ball bearing unit. With this construction, the idler wheel is pivoted with the receiving bar to enable a panel to drop cleanly onto the stack when the receiving bars are swung to their vertical positions.

If more than two sorts are required in a given sorting system, additional intermediate stackers of the same construction as the foregoing-described stacker $S_1$ would be used.

END STACKER

The end stacker $S_2$ is similar in construction to the intermediate stacker $S_1$ as just described with the exception that the end stacker does not require booster means and a retractable end stop since the end stacker need not function to convey panels horizontally therethrough. In place of the retractable end stop, there is provided a fixed end stop of substantially the same configuration and at about the same relative location as the former, extending vertically to define the downstream end of the panel flow path. The infeed assembly, stacking assembly and unloading assembly of the end stacker would be the same as the corresponding assemblies of the intermediate stacker.

CONTROL CIRCUIT

From the foregoing description, it will be apparent that most of the operations of each stacker are accomplished through the use of air cylinders with the exception of the scissors lift, the raising of which is accomplished by an electric motor-driven pump and hydraulic cylinder (not shown), in a conventional manner. The air cylinders are solenoid actuated, with coordination of the solenoids of the two stackers and the sequencing of the solenoids for each stacker being controlled through limit switches, time delays and relays in an electrical circuit such as the one shown in FIG. 11. The solenoid valves used in conjunction with each stacker are housed as shown in FIG. 3 in a mounting bracket 240 at the opposite ends of the machine with a main air line A leading to each block of solenoids from a remote source of air pressure (not shown) and tributary air lines AA leading therefrom to the appropriate air cylinders.

The electrical control circuit also incorporates a memory means which enables the control panel C for the sorting system to be located at a position remote from the stacking units so that an operator can inspect a panel and select the stacker into which the panel is to be stacked long before the panel reaches the stackers, as shown in FIG. 1. This means also permits the operator to select a stacker for one panel as soon as the preceding panel has entered the infeed end of the first stacker, thus enabling the feeding of panels into the stackers at a rapid rate.

FIG. 11 diagrams a portion of a typical electrical circuit suitable for use in controlling the operation of the two-sort sorting system illustrated in FIG. 1. This circuit incorporates electric motors M1 and M2 for driving the infeed wheels of stackers $S_1$ and $S_2$ respectively with the latter motor also operating the booster wheels of stacker $S_1$, as previously mentioned. The circuit also incorporates motors M3 and M4 for operating the scissors hoist of stackers $S_1$ and $S_2$ respectively.

Operation

Referring to the diagram of FIG. 11, the operation of the sorting system is as follows: First, an operator at the remote control panel C presses a start button 242 to close a circuit through lines L3 and L4 between feeder lines L1 and L2 to energize relays $m1$ and $m2$ which in turn close switches to start motors M1 and M2 to drive the infeed wheels of stackers $S_1$ and $S_2$ and the booster wheels of $S_1$. The motors M1 and M2 will continue to run until a stop button 243 on the control panel is pushed to open the circuit through lines L3 and L4. Completion of a circuit through line L4 also sends power to the bin selector buttons 244 and 246 for stackers $S_1$ and $S_2$ respectively.

Assuming first that it is desired to stack a panel in stacker $S_1$, selector button 244 is pressed to complete a circuit through line L5 and thereby illuminate a pilot light 248 on the control panel and energize a relay R1. Relay R1 then closes a holding-in switch in line L6, and at the same time opens a switch in line L8 which controls the feeding of power to circuit elements controlling the operation of stacker $S_2$. It will be noted that lines L5 and L6 controlling stacker $S_1$ and lines L7 and L8 for stacker $S_2$ are interlocked by relays R1 and R2 so that both stackers cannot be conditioned for operation simultaneously should button 246 be pressed accidentally after button 244 has been pressed but before the panel reaches stacker $S_1$. If this should happen, the last button to be pressed before the panel reaches stacker $S_1$ would control the bin into which the panel would be stacked.

Still assuming that selector button 244 for stacker $S_1$ has been pressed to energize relay R1, the relay also closes a switch between lines L10 and L11. Thus when the panel reaches the infeed end of stacker $S_1$, it strikes a contact 241 (FIG. 3) of limit switch LS1 to close the latter. Closing limit switch LS1 in line L10 immediately energizes solenoid SOL 1 to move the infeed pressure wheels 46 against the panel and convey it onto the receiving bars. At the same time, time delay TD1 in line L11 starts timing out, and solenoid SOL 2 in line L12 is energized to swing end stop 100 down into its panel-limiting position. When the panel travels onto the receiving bars to reopen LS1, the infeed pressure wheels return to their raised positions. When time delay TD1 times out, it completes a circuit through line L14 to energize solenoid SOL 3 and thereby drop the receiving bars of stacker $S_1$ to release the panel, which by this time has been conveyed to a position against the stop 100.

Completion of the circuit through line L14 also energizes time delays TD2 and TD4 in lines L18 and L19. When TD2 is energized, it immediately de-energizes TD1, thus also de-energizing SOL 2 to retract the end stop. When TD2 times out, it energizes solenoids SOL 4 and SOL 5 in lines L20 and L23 respectively to actuate the side crowders and end crowder of stacker $S_1$. Actuation of the end crowder pushes the newly added panel on the top of the stack against the contact of limit switch LS2 to close the same in line L27. However, a circuit through L27 is not completed through line L27 until TD4 times out, which is after the side and end crowders have retracted. Completion of a circuit through L27 energizes solenoid SOL 7 to lower the hoist table. The hoist continues to lower until either the top panel clears the contact of limit switch LS2 to open the same or until time delay TD4 times out to break the circuit through line L27, whichever occurs first.

When TD2 times out, it also completes a circuit through line L22 to energize time delay TD3. The immediate effect of this is to open line L16 to de-energize solenoid SOL 3 and return the receiving bars to their horizontal positions in readiness for the next panel. When TD3 times out, it opens line L20 to de-energize SIL 4 and SOL 5 and thereby return the side and end crowders to their normally retracted positions.

Panels can continue to accumulate in stacker $S_1$ in accordance with the foregoing sequence of operations until the stack in stacker $S_1$ reaches a predetermined height. When this occurs, the lower panel on the stack closes limit switch LS4 at the bottom of the frame (FIG. 2) to close line L34 and thereby energize relay R4. At the same time line L33 is closed to energize solenoid SOL 8 and thereby open the gates for the side crowders to permit the stack to be removed from the bin.

Energizing relay R4 closes a holding switch in line L36 and opens line L37 to de-energize hoist relay $m3$ and thus shut off hoist motor M3. Relay R4 when energized also closes line L28 to energize solenoid SOL 7 and thereby lower the lift table to its lower limit position. In this position, previously discussed, the stack comes to rest on the rollers in the tilt roll case of stacker $S_1$ and thereafter rolls onto the outfeed rolls and out of the bin of such stacker.

Activation of relay R4 also closes line L31 to energize relay R3 in line L30, which in turn closes a switch in line L37 containing relay $m3$ so as to condition line L37 to restart hoist motor M3 as soon as relay R4 becomes de-energized. This does not occur, however, until time delay TD5 becomes energized. TD5 is energized by the outgoing stack striking the contact of a limit switch LS5 near the outer end of outfeed roll case 160. TD5 then opens line L36 to de-energize relay R4 and thereby open line L27 to the hoist down solenoid SOL 7 and reclose line L37 to restart hoist motor M3. When this occurs, the hoist table rises.

The table continues to rise until it reaches an upper limit position at which point it opens a normally closed limit switch LS3 on upper portion of the frame to de-energize relay R3 in line L30 and thereby reopen line L37 to stop the hoist motor.

It is important to point out that when relay R3 first becomes energized through the closing of limit switch LS4 by a full stack on the platform, line L25 becomes closed to energize SOL 6 which acts to swing the accumulators into their extended positions beneath the receiving bars to receive panels during the unloading operation. The accumulators remain in their operative positions until relay R3 is de-energized by the hoist table reaching its upper limit position. The side crowder gates of stacker $S_1$ reclose when relay R4 becomes de-energized in the manner mentioned above.

This completes an operating cycle of intermediate stacker $S_1$ when panels are stacked therein. However, when a panel is to be stacked in end stacker $S_2$ the following sequence of operations occurs: Selector button 246 for the bin of stacker $S_2$ is pressed by the operator at the remote control panel. This energizes relay R2 in line L7 to open line L6 for the S1 selector button. Relay R2 also closes a switch between lines L9 and L10 so that when a panel closes limit LS1 at the infeed end of stacker $S_1$, SOL 1 for the infeed wheels of stacker $S_1$ is energized as before, and time delay TD6 is also energized. When time delay TD6 times out, it energizes solenoid SOL 9 in line L42 to lower the booster wheels of stacker $S_1$ into engagement with the panel, which by then is on the receiving bars to boost the panel horizontally through the outfeed end of stacker $S_1$ and into the infeed end of stacker $S_2$. When the panel enters stacker $S_2$ it closes limit switch LS6 in line L44 to energize solenoid SOL 10, which activates the infeed wheels of stacker $S_2$ to convey the panel against the fixed end stop of such stacker. The closing of limit switch LS6 also energized a time delay TD7 in line L45 which, when it times out, drops the receiving bars of stacker $S_2$. Thereafter, the sequence of operations, and therefore the portion of the control circuit applicable to stacker $S_2$, are the same as described with respect to stacker $S_1$, with the exception that stacker $S_2$ need not be equipped with booster wheels and a movable end stop so that solenoids and appurtenant portions of the circuit corresponding to SOL 2 and SOL 9 of stacker $S_1$ are eliminated in the control circuit for $S_2$. Specifically, the circuits applicable to the hoist-lowering, unloading and hoist-raising operations are identical in the two stackers. Accordingly, the remaining details of the control circuit for stacker $S_2$ are omitted.

With the foregoing circuit it is possible to determine, through pressing of the proper selector button, the bin into which a panel will be stacked as soon as the preceding panel has passed into the infeed end of stacker $S_1$ past limit switch LS1, thus permitting the sorting of panels in rapid succession from a remote inspection station where the remote control selector panel C is also situated. The circuit also permits stacking of successive panels in the same stacker without pressing the selector button for each panel. Thus, once a selector button is pressed, panels will continued to be stacked in the same stacker until the other selector button is pressed. If a stacker is to be used singly, the selector and memory portion of the circuit could be eliminated entirely. If, on the other hand, stackers are to be used in multiples of more than two, the circuit would be expanded accordingly, with each of the intermediate stackers having a circuit like that of stacker $S_1$.

From the foregoing, it will be apparent that a sorting system in accordance with the invention can incorporate any number of intermediate stackers depending on the number of sorts required.

Having described the invention in what is believed to be its preferred form, it should be apparent to those skilled in the art that the invention permits of modification in arrangement and detail. I claim as my invention all such modifications as come within the true spirit and scope of the appended claims.

I claim:
1. An apparatus for stacking panels comprising:
    panel-receiving means including a pair of horizontally disposed and opposed laterally inwardly opening channel-shaped members including a normally horizontal panel-supporting bottom flange, an upright side guide flange, and a horizontal panel-retaining top flange,
    means stationarily mounting said side and top flanges,
    means pivotably mounting said bottom flanges for downwardly and outwardly pivoting movement about parallel axes for releasing a panel vertically therefrom,
    infeed means adjacent an upstream end of said receiving means and positioned at a level for feeding panels horizontally between said top and bottom flanges, the pivot axes of said bottom flanges extending generally parallel to the direction of feed from said infeed means and being positioned outwardly of their associated said vertical flanges and below the panel-receiving portions of said bottom flanges.

2. An apparatus for stacking panels according to claim 1 wherein:
    each of said panel-supporting flange portions comprises a strip extending longitudinally in a direction generally parallel to its pivot axis, and
    means for pivoting said strips simultaneously about their respective axes to drop a panel supported therebetween vertically onto a stack below while said panel remains in a substantially horizontal disposition.

3. An apparatus according to claim 2 wherein each said strip has a flat, smooth upper surface so as to offer a minimal frictional resistance to sliding of panels thereover.

4. An apparatus according to claim 3 wherein said strips are of metal and have polished upper surfaces to enhance the sliding of panels thereon.

5. An apparatus for stacking panels according to claim 2 wherein each strip extends continuously from one end thereof to the other and has a length sufficient to support substantially the entire length of a panel received thereon so as to prevent a panel slid thereover from hanging up thereon.

6. An apparatus for stacking panels according to claim 1 including means for pivoting said panel-supporting members downwardly at the same time whereby a panel on said supporting members is dropped vertically therefrom while remaining in a horizontal disposition.

7. An apparatus according to claim 6 wherein said pivoting means includes fluid power cylinder means and linkage means including a double-throw crank means connecting said power cylinder means to both said supporting members.

8. Apparatus according to claim 6 including infeed means adjacent the upstream ends of said supporting members for feeding panels generally horizontally one at a time onto said supporting members.

9. Apparatus according to claim 8 wherein said infeed means includes a pair of pinch wheel means at the infeed end of said stacker.

10. Apparatus according to claim 8 wherein the infeed end of said stacker includes infeed guide means for guiding a panel horizontally into said infeed means.

11. Apparatus according to claim 8 including selectively operable booster means adjacent the downstream ends of said supporting members for conveying a panel supported on said members horizontally in a direction downstream from said members.

12. Apparatus according to claim 1 including stop means positioned adjacent the downstream ends of said support members for limiting downstream travel of panels on said support members to a position wherein the downward pivoting of said support members will drop a panel from said support members onto a stack below without interference from other elements of said apparatus.

13. Apparatus according to claim 1 including a vertically movable stack support means positioned in vertical alignment beneath said supporting members for receiving a panel dropped therefrom, and
    means for automatically adjusting the height of said stack support means upon the addition of each new panel to a stack thereon so that the top of said stack is maintained at a substantially constant level beneath said supporting members during the stacking of panels on said stack support means.

14. An apparatus according to claim 13 wherein said means for adjusting the height of said table includes limit switch means at a fixed predetermined height on said apparatus and panel crowder means operable to shove each top panel on said stack against said limit switch means and thereby lower said stack support means until said top panel clears said limit switch means.

15. Apparatus according to claim 13 including stack support means beneath said panel-supporting members for receiving panels released from said members and fixed side and end crowding means and movable side and end crowding means movable at intervals against an upper side and end of a stack on said support means to maintain the panels in said stack in vertical alignment against said fixed side and end crowding means.

16. Apparatus according to claim 15 including means for automatically removing a stack from said stack support means when said stack reaches a predetermined height, and accumulator means movable into an operative position between said stack support means and said supporting members to receive panels dropped by said supporting members when said stack support means is being unloaded.

17. Apparatus for stacking panels comprising:
frame members defining a generally rectangular open frame structure having an infeed end and an outfeed end,
a pair of laterally opposed and longitudinally extending panel-receiving rails within an upper portion of said frame structure and extending longitudinally between said infeed end and said outfeed end,
each of said rails including a lower panel-receiving and supporting bar, an upright panel-guiding wall extending upwardly from said receiving bar, and an upper panel-retaining flange extending laterally inwardly from said upright wall above said receiving bar,
means mounting each receiving bar for downward pivoting movement from a generally horizontal disposition to a generally vertical disposition independently of its associated said upright wall and upper flange,
infeed means including a set of infeed pinch wheels on said frame for conveying a panel fed between said pinch wheels onto said receiving bars,
infeed guide means at said infeed end for guiding a panel fed horizontally into said guide means between said infeed pinch wheels,
stop means adjacent said outfeed end for limiting the downstream travel of a panel on said receiving bars,
means for pivoting said receiving bars simultaneously so as to release a panel vertically while said panel remains horizontally disposed,
a stack support for receiving panels released from said receiving bars,
movable side and end crowder means for maintaining a vertical stack on said stack support,
stack unloading means for removing a stack from said stack support when said stack reaches a predetermined height and for conveying said stack to a position outside said frame,
accumulator means on said frame movable into position between said stack support and said receiving bars to receive panels released from said bars when said stack support is being unloaded,
power means for operating the movable elements of said stacker, and
electrical control means for controlling the sequence of operation of the various elements of said machine.

18. A panel stacker according to claim 17 including booster means on said frame adjacent said outfeed end,
said booster means including driven booster wheel means selectively movable into engagement with a surface of a panel on said receiving bars for conveying a panel from said bars horizontally through said outfeed end,
said stop means being selectively movable from a position blocking horizontal downstream movement of a panel from said receiving bars to a position permitting such movement,
said control means including selector means remote from the stacking unit for selectively operating either said booster means to convey a panel horizontally through said outfeed end or said receiving bars and said stop means to prevent horizontal travel of a panel through said stacker and to release said panel onto said stack support.

19. Apparatus according to claim 17 wherein said power means includes air cylinder means and said control means includes solenoid valve means and sequencing means for operating said solenoid valves in predetermined sequence.

20. A panel-sorting system comprising in combination:
at least two panel-stacking units arranged in a line end to end,
said units including a first unit having an infeed end for receiving panels fed thereto one at a time along a generally horizontal flow path and an outfeed end, and
a second unit having an infeed end adjacent the outfeed end of said first unit for receiving panels from said first unit,
each of said units including a pair of horizontally opposed panel-supporting members extending longitudinally between the opposite ends of said unit in an upper portion thereof for supporting laterally opposite edges of a panel,
said members in each unit being pivoted for downward swinging movement about parallel axes extending longitudinally of said unit,
means in each unit for pivoting the supporting members of the same unit simultaneously downwardly to release a panel therefrom onto a stack below,
booster means adjacent the outfeed end of said first unit operable upon preselection to convey a panel from the supporting members of said first unit horizontally through the outfeed end of said first unit and into the infeed end of said second unit, and
control means for said units including selector means for preselecting the one of said units into which a panel is to be stacked,
said control means including means for actuating said support members of said first unit to release a panel therefrom onto a stack in said first unit without actuating said booster means upon preselection of said first unit, and for actuating said booster means without actuating the support members of said first unit upon preselection of said second unit.

21. A panel-sorting system according to claim 20 wherein said control means includes selector means remote from said units and a memory means so that the preselection of a stacking unit can take place at a position upstream from said stacking units.

22. A panel-sorting system according to claim 20 wherein there is one end stacking unit at the downstream terminus of a conveyor line and at least one intermediate stacking unit upstream from and adjacent to said end unit,
said end unit including infeed pinch wheels for feeding panels onto the support members of said unit and a fixed end stop for limiting the downstream travel of a panel on said support members of said unit,
each intermediate stacking unit including infeed pinch wheels for feeding panels onto the support members of said unit, outfeed pinch wheels adjacent the downstream end of the support members of said unit, and a movable stop means adjacent the downstream end of the support members of said unit for limiting the downstream travel of a panel on said support members upon preselection of said unit to stack a given panel.

23. A panel-sorting system according to claim 21 wherein said control means includes means permitting the preselection of a unit for a panel as soon as the last preceding panel has entered the infeed end of said first stacking unit.

24. An apparatus for stacking panels comprising:
panel receiving means for receiving a horizontally disposed panel,
said panel-receiving means including a pair of horizontally opposed inwardly opening, channel-shaped panel-supporting members normally disposed generally horizontally along opposite sides of a panel flow path including bottom flange members for supporting panels fed onto said members,
means for pivoting said bottom flange members downwardly at the same time while the remainder of said channel-shaped members remain stationary to release a panel supported on said flange members vertically but in a horizontal disposition,
infeed means adjacent the upstream end of said panel-supporting members positioned vertically at a level for feeding one panel at a time generally horizontally onto said supporting members,
selectively operable, vertically movable, driven booster wheel means adjacent the downstream ends of said supporting members for selectively engaging a panel on said flange members and conveying said panel from said members horizontally in a direction downstream from said members,
movable stop means positioned for limiting downstream travel of a panel on said flange members when said panel is to be dropped vertically from said flange members onto a stack below, said stop means being movable to a position permitting travel of a panel downstream from said support members through operation of said booster wheel means.

25. An apparatus for stacking pnaels comprising:
panel-receiving means for receiving a horizontally disposed panel fed thereto in a generally horizontal flow path,
said panel-receiving means including:
a pair of horizontally opposed panel-supporting members normally disposed generally horizontally along opposite sides of said flow path for engaging laterally opposite under edge portions of said panel and thereby supporting the same,
said supporting members being mounted for downward pivotal movement about parallel axes for releasing said panel vertically onto a stack therebelow,
means for pivoting said panel-supporting members downwardly at the same time,
infeed means adjacent the upstream ends of said supporting members for feeding panels generally horizontally one at a time onto said supporting members,
selectively operable booster means including a driven booster wheel selectively engageable with a panel on said supporting members adjacent the downstream ends of said supporting members for conveying said panel horizontally in a direction downstream from said members,
said booster means including an idler wheel rotatably carried on each said support member with a peripheral portion of each said idler wheel extending above the upper surface of said support member for facilitating the conveyance of a panel along said support members.

26. An apparatus for stacking panels comprising:
panel-receiving means for receiving a horizontally disposed panel fed thereto in a generally horizontal flow path,
said panel-receiving means including:
a pair of horizontally opposed panel-supporting members normally disposed generally horizontally along opposite sides of said flow path for engaging laterally opposite under edge portions of said panel and thereby supporting the same,
said supporting members being mounted for downward pivotal movement about parallel axes for releasing said panel vertically onto a stack therebelow,
means for pivoting said panel-supporting members downwardly at the same time,
infeed means adjacent the upstream ends of said supporting members for feeding panels generally horizontally one at a time onto said supporting members.
selectively operable booster means, including a pair of driven pressure wheels movable downwardly against the top surface of a panel on said supporting members with one of said wheels being aligned above each said supporting member,
said booster means including a pair of idler wheels, one rotatably mounted on each said support member,
each said idler wheel extending above the upper surface of its support member and being aligned vertically beneath said pressure wheels when said pressure wheels are in their operative positions for facilitating the conveyance of a panel horizontally from said support members.

References Cited
UNITED STATES PATENTS

| | | | |
|---|---|---|---|
| 1,569,033 | 1/1926 | Reichel | 214—6 |
| 1,863,465 | 6/1932 | Borrowdale | 271—88 |
| 1,942,172 | 1/1934 | Johnson | 271—88 |
| 2,257,220 | 9/1941 | Becker | 214—11 X |
| 2,492,889 | 12/1949 | Royal | 271—86 X |
| 2,627,354 | 2/1953 | Isella et al. | 214—6 |
| 2,946,465 | 7/1960 | Raynor | 214—6 |
| 3,126,657 | 3/1964 | Hajos. | |
| 3,306,609 | 2/1967 | Beuck | 271—71 |
| 2,634,852 | 4/1953 | Clauss | 214—6 X |

FOREIGN PATENTS

German printed application 1,195,987 (1965).

GERALD M. FORLENZA, *Primary Examiner.*

R. J. SPAR, *Assistant Examiner.*

U.S. Cl. X.R.

271—64